United States Patent
Berry

(10) Patent No.: US 8,646,736 B2
(45) Date of Patent: Feb. 11, 2014

(54) HOLDING DEVICE FOR AN ELECTRONIC DEVICE

(76) Inventor: James Berry, Los Angeles, CA (US)

( * ) Notice: Subject to any disclaimer, the term of this patent is extended or adjusted under 35 U.S.C. 154(b) by 51 days.

(21) Appl. No.: 13/188,369

(22) Filed: Jul. 21, 2011

(65) Prior Publication Data

US 2012/0018595 A1  Jan. 26, 2012

Related U.S. Application Data

(60) Provisional application No. 61/366,426, filed on Jul. 21, 2010.

(51) Int. Cl.
F16L 3/00  (2006.01)

(52) U.S. Cl.
USPC ... 248/121; 248/126; 361/679.01; 361/309.1; 361/176.1; 361/917; 220/737

(58) Field of Classification Search
USPC ......... 248/688, 690, 692, 445, 448, 451, 452, 248/453, 455, 454, 457, 351, 346.07, 670, 248/671, 447, 309.1, 316.7, 316.1, 917, 248/924, 923, 919, 472, 463, 465, 126, 136, 248/176.1, 617, 450, 490, 488, 491; 40/745, 747, 748, 749, 750, 755; 361/679.01, 679.59; 24/523, 3.13, 312, 24/3.1, 457; 220/737, 63, 629, 628
See application file for complete search history.

(56) References Cited

U.S. PATENT DOCUMENTS

| | | | | |
|---|---|---|---|---|
| 1,398,483 A * | 11/1921 | Theron | ........................ | 24/710.7 |
| 1,757,301 A * | 5/1930 | Ferguson | ........................ | 24/344 |
| 2,016,942 A * | 10/1935 | Horwitt et al. | .................. | 40/739 |
| 2,108,198 A * | 2/1938 | Egger | ............................. | 24/344 |
| 2,290,645 A * | 7/1942 | Lange | ............................ | 248/539 |
| 2,535,563 A * | 12/1950 | Boyer et al. | .................. | 248/506 |
| 2,632,971 A * | 3/1953 | Manczek et al. | ................ | 40/741 |
| 2,653,330 A * | 9/1953 | Nolan | .................. | 5/94 |
| 2,958,760 A * | 11/1960 | McNally | ...................... | 362/275 |
| 3,076,285 A * | 2/1963 | Sparkman | ..................... | 248/448 |
| 3,842,849 A * | 10/1974 | Goodman | ..................... | 132/273 |
| 4,118,003 A * | 10/1978 | Dillow | .......................... | 248/539 |
| 4,395,057 A * | 7/1983 | Young | ............................ | 281/42 |
| 4,614,322 A * | 9/1986 | Goetz | ........................... | 248/490 |
| 4,768,264 A * | 9/1988 | Kunna et al. | ................... | 24/522 |
| 4,940,204 A * | 7/1990 | Nelson et al. | .................. | 248/688 |
| 4,991,809 A * | 2/1991 | Harkey | .................... | 248/229.12 |
| 5,033,709 A * | 7/1991 | Yuen | ............................ | 248/313 |
| 5,305,381 A * | 4/1994 | Wang et al. | .................... | 379/455 |
| 5,457,745 A * | 10/1995 | Wang | ............................ | 379/454 |
| 5,555,302 A * | 9/1996 | Wang | ............................ | 379/446 |
| 5,685,732 A * | 11/1997 | Lane | ............................. | 439/369 |
| 5,697,071 A * | 12/1997 | Fan | ............................. | 455/575.9 |
| 5,703,946 A * | 12/1997 | Chen | ............................ | 379/446 |
| 5,788,202 A * | 8/1998 | Richter | ..................... | 248/316.4 |

(Continued)

*Primary Examiner* — Kimberly Wood

(74) *Attorney, Agent, or Firm* — Pearne & Gordon LLP

(57) ABSTRACT

According to one aspect, the subject application involves a holding device for an electronic device. The holding device includes a first clip adapted to cooperate with a peripheral portion of the electronic device. A second clip opposes the first clip and is separated from the first clip by a first distance. The second clip is adapted to cooperate with a separate peripheral portion of the electronic device. A substantially-elastic band is provided to extend between the first clip and the second clip, and a back plate is at least partially disposed between the first clip and the second clip.

10 Claims, 7 Drawing Sheets

(56) References Cited

U.S. PATENT DOCUMENTS

| | | | | |
|---|---|---|---|---|
| 5,836,563 A * | 11/1998 | Hsin-Yung | | 248/316.4 |
| 5,903,645 A * | 5/1999 | Tsay | | 379/455 |
| 5,982,885 A * | 11/1999 | Ho | | 379/446 |
| 6,073,901 A * | 6/2000 | Richter | | 248/316.4 |
| 6,085,113 A * | 7/2000 | Fan | | 455/569.1 |
| 6,366,672 B1 * | 4/2002 | Tsay | | 379/446 |
| 6,427,959 B1 * | 8/2002 | Kalis et al. | | 248/288.11 |
| 6,585,212 B2 * | 7/2003 | Carnevali | | 248/346.07 |
| 6,966,533 B1 * | 11/2005 | Kalis et al. | | 248/316.4 |
| 7,066,437 B2 * | 6/2006 | Iizuka | | 248/447 |
| 7,418,097 B2 * | 8/2008 | Chang | | 379/446 |
| 7,441,981 B2 * | 10/2008 | Crain et al. | | 403/321 |
| 7,523,528 B2 * | 4/2009 | Carnevali | | 24/523 |
| 7,551,458 B2 * | 6/2009 | Carnevali | | 361/807 |
| 8,074,951 B2 * | 12/2011 | Carnevali | | 248/313 |
| 2001/0042814 A1 * | 11/2001 | Sui | | 248/231.51 |
| 2004/0254002 A1 * | 12/2004 | Tsay | | 455/575.9 |
| 2006/0215836 A1 * | 9/2006 | Wang | | 379/455 |
| 2007/0045495 A1 * | 3/2007 | Asano et al. | | 248/309.1 |
| 2007/0262223 A1 * | 11/2007 | Wang et al. | | 248/346.07 |
| 2008/0099638 A1 * | 5/2008 | Diener et al. | | 248/176.3 |
| 2008/0156836 A1 * | 7/2008 | Wadsworth et al. | | 224/269 |
| 2009/0060473 A1 * | 3/2009 | Kohte et al. | | 386/124 |

* cited by examiner

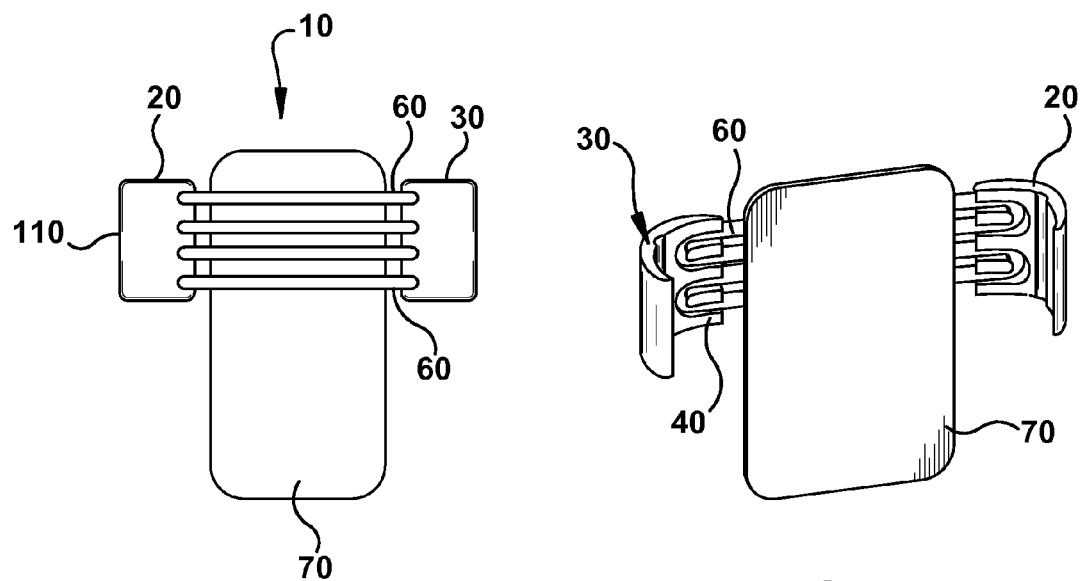
FIG. 1
FIG. 2
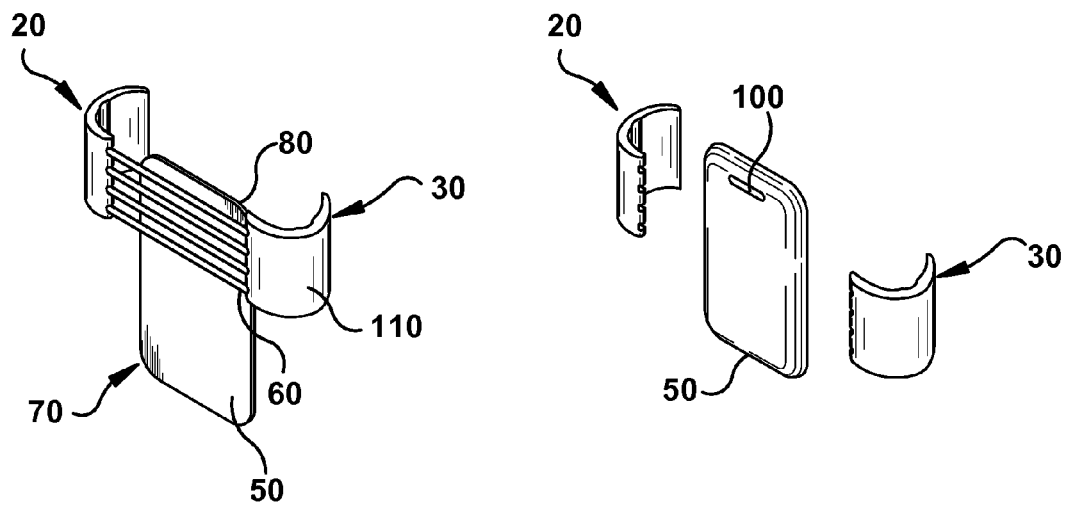
FIG. 3
FIG. 4

HOLDING DEVICE FOR AN ELECTRONIC DEVICE

CROSS-REFERENCE TO RELATED APPLICATIONS

This application claims the benefit of U.S. Provisional Application No. 61/366,426, filed Jul. 21, 2010, the entirety of which is incorporated herein by reference.

TECHNICAL FIELD

This application relates generally to an accessory for an electronic device and, more specifically, to a holding device that is to be removably coupled to a portable electronic device for coupling the portable electronic device to a user and optionally maintaining an upright orientation of the portable electronic device.

BACKGROUND OF THE INVENTION

Mobile electronic devices such as smart phones have evolved to include the processing power necessary to perform a wide range of tasks. Users can place telephone calls and send text/email messages, browse the Internet, take digital photographs, play games, watch video and listen to audio, and participate in other activities. Due to this versatility, users rarely travel anywhere without their smart phones and/or and other portable electronic devices.

Such portable electronic devices can be placed in the pocket of the user's clothing. But the portable electronic devices are often not easily and quickly retrievable from a pocket to answer an incoming telephone call or to quickly capture a photograph of a subject that is available for only a very short window of time. And placing the portable electronic device in a pocket can muffle the sound of a ringtone, making it difficult to hear audible alerts to an incoming telephone call and/or message.

More recently, users have been able to purchase a holster that is to be clipped onto an article of clothing worn by the user. Such holsters typically include a sleeve formed from a rigid plastic to receive the portable electronic device. But such holsters are bulky and often uncomfortable to wear when seated, and remain attached to the user's clothing while the portable electronic device is in use. Further, conventional holsters lack utility while the portable electronic device is in use.

SUMMARY

According to one aspect, the subject application involves a holding device for an electronic device. The holding device includes a first clip adapted to cooperate with a peripheral portion of the electronic device. A second clip opposes the first clip and is separated from the first clip by a first distance. The second clip is adapted to cooperate with a separate peripheral portion of the electronic device. A substantially-elastic band is provided to extend between the first clip and the second clip, and a back plate is at least partially disposed between the first clip and the second clip.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 shows a back view of an illustrative embodiment of a holding device for coupling an electronic device to a user;

FIG. 2 shows a front view of the illustrative embodiment of the holding device in FIG. 1;

FIG. 3 shows a perspective side view of the illustrative embodiment of the holding device in FIG. 1;

FIG. 4 shows an exploded view of the illustrative embodiment of the holding device in FIG. 1, with a generally T-shaped slot exposed;

DETAILED DESCRIPTION

Figure 5:
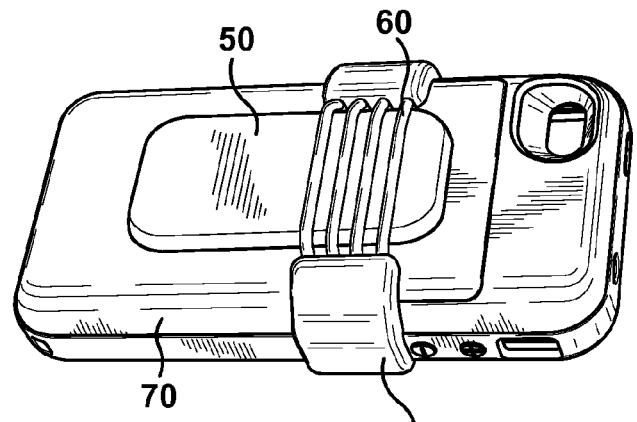
FIG. 5 shows a side view of the illustrative embodiment of the holding device in FIG. 1 including the electronic device.
Figure 6:
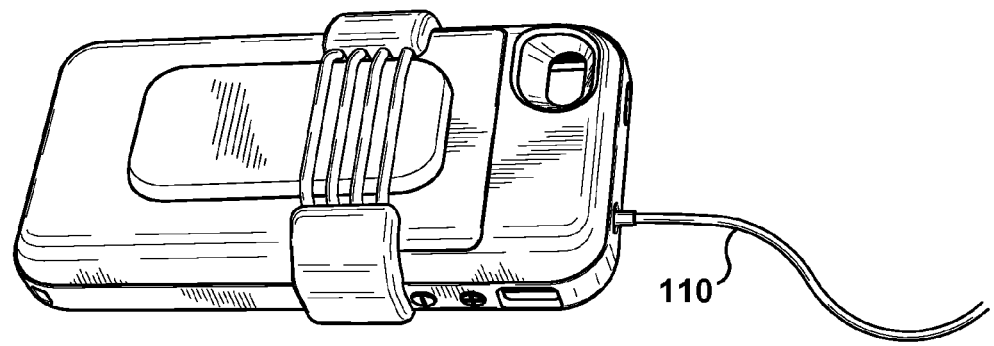
FIG. 6 shows a side view of the illustrative embodiment of the holding device in FIG. 1, including the electronic device and the strap.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Broadly, subject application relates to a holding device for an electronic device that allows a user to attach the electronic device in a secure fashion to his or her person, minimizing the likelihood of losing or damaging the electronic device. Illustrative embodiments of the holding device may be used to hold portable electronic devices such as iPhones® or other cellular phones, iPods®, iPod Touch®, and the like.

Figure 8:
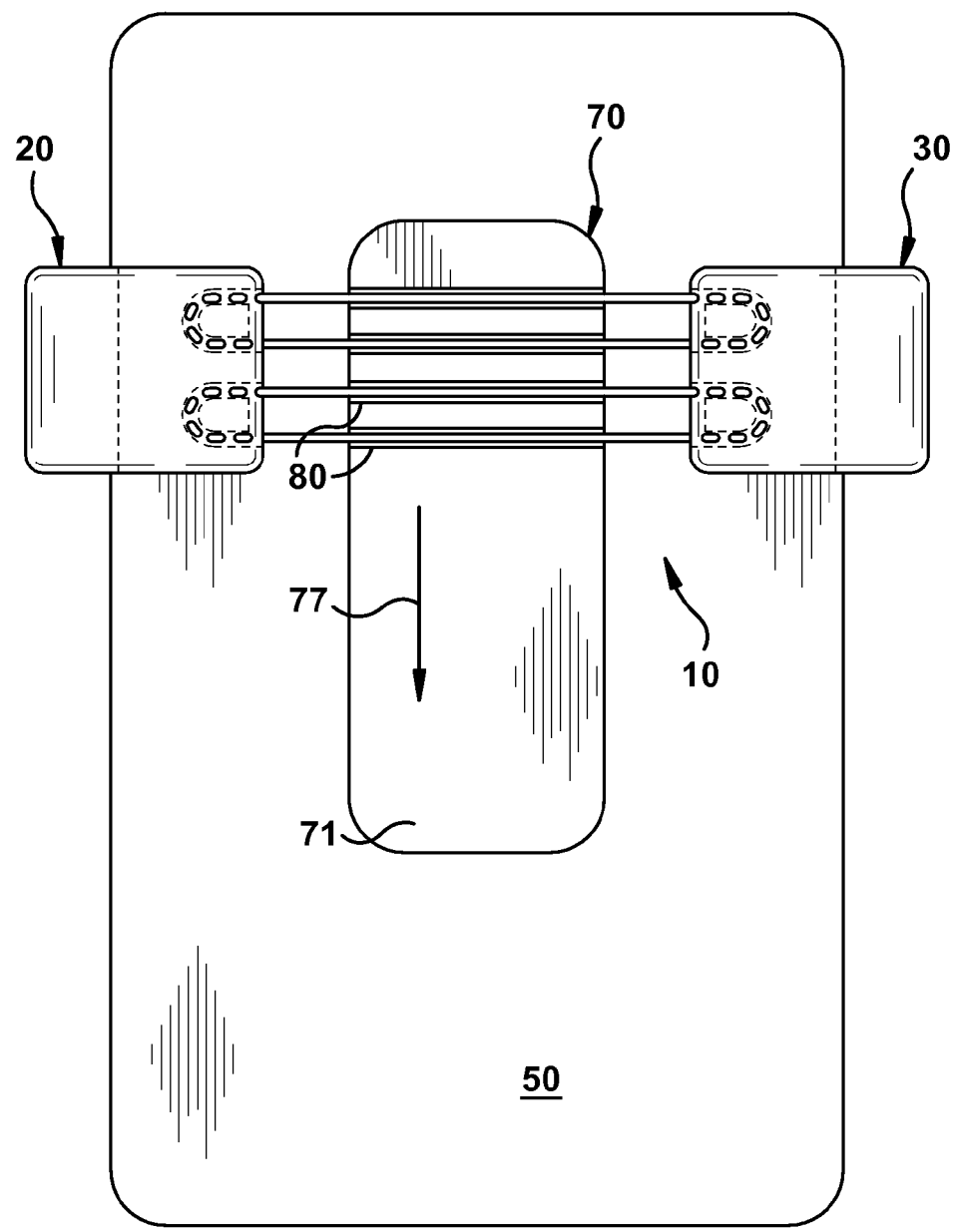
FIG. 8 shows a rear view of an illustrative embodiment of a holding device coupled to a portable electronic device.
Figure 9:
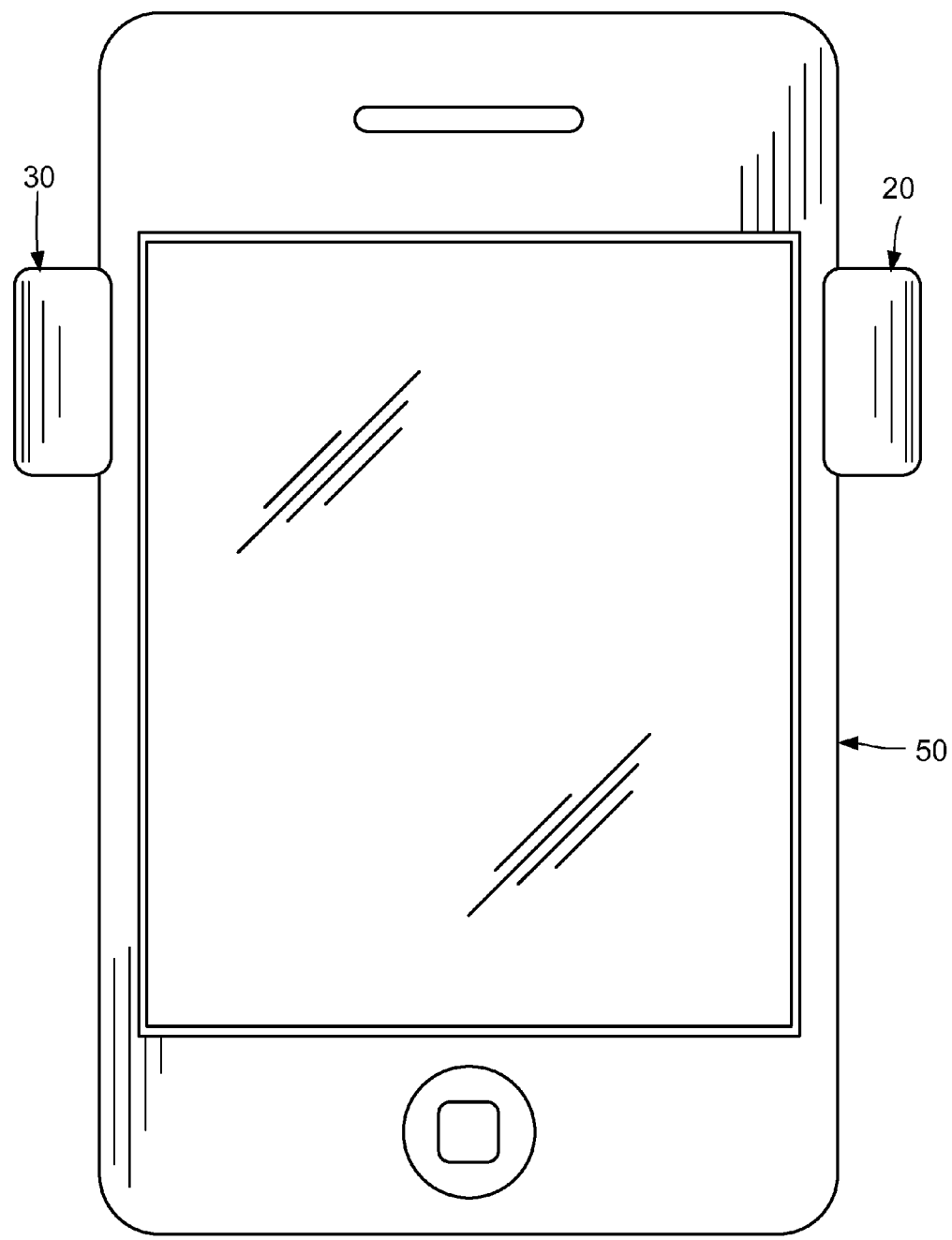
FIG. 9 shows a front view of an illustrative embodiment of a holding device coupled to a portable electronic device.
Figure 14:
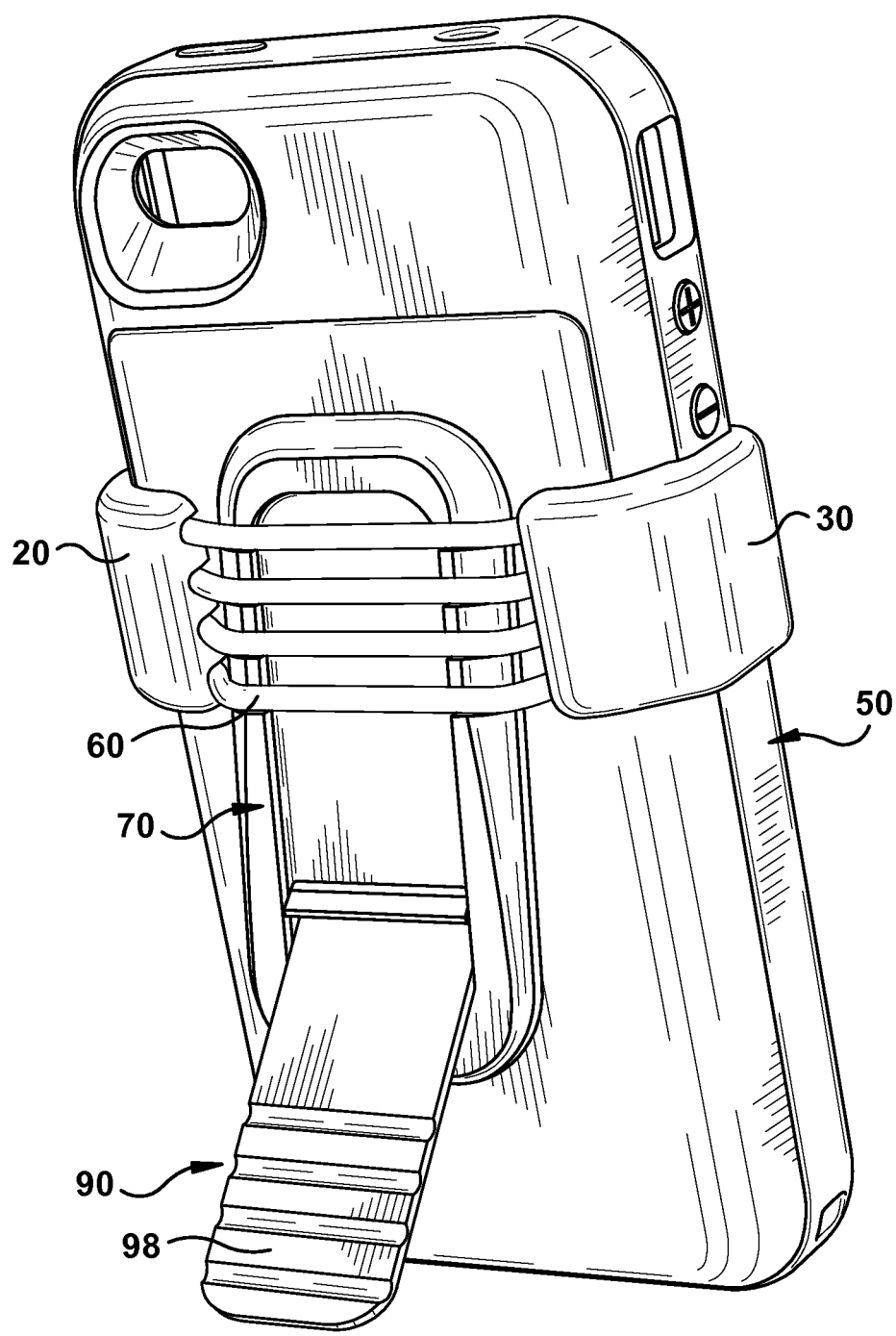
FIG. 14 shows a perspective view of an illustrative embodiment of a holding device provided with an adjustable kickstand maintaining a portable electronic device in an upright orientation for viewing by a user.

An illustrative embodiment of a holding device 10 is shown in FIG. 1, and includes a first clip 20, a second clip 30, at least one substantially-elastic band 60 that extends between, and couples the first clip 20 and the second clip 30 together. A back plate 70 is disposed between the first clip 20 and the second clip 30 and is supported between the band(s) 60 and the electronic device 50 as shown in FIGS. 5, 8 and 14. The elasticity of the band(s) 60 extending between the first and second clips 20, 30 can optionally urge the back plate 70 generally toward the electronic device 50. In use, the back plate 70 can be clipped over a belt, onto a pocket or on any other portion of clothing worn by the user. When coupled to clothing in this manner, a portion of the clothing is received between the back plate 70 and the electronic device 50.

Figure 7:
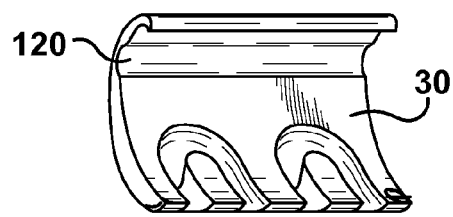
FIG. 7 shows an inside view of an illustrative embodiment of a side clip.

The first clip 20, the second clip 30, or both the first clip 20 and the second clip 30 can be of any suitable shape and size to cooperate with peripheral portions of the electronic device as shown in FIGS. 5, 6, 9 and 14, thereby coupling the holding device 10 to the electronic device 50. In one embodiment, the first clip 20 can be generally C-shaped, as shown in FIGS. 3, 4 and 7, and have a diameter from about 0.25 inch. to about 0.75 inch, and extend about 0.3 inch in length. According to one embodiment, the first clip 20 and/or the second clip 30 may have a diameter of about 0.5 inch, but the first clip 20 and/or the second clip 30 can each independently have any suitable dimensions for cooperating with the particular electronic device 50 on which the holding device 10 is to be installed. The dimensions of the clips 20, 30 relative to the back plate 70 allows a portion of the back plate 70 to extend a greater extent in a downward direction (as indicated by arrow 77 in FIG. 8) than the clips 20, 30. Thus, a portion 71 of the back plate 70 can be separated from the electronic device 50 by the portion of the user's clothing to couple the holding device 10 to the user without interfering with the cooperation between the clips 20, 30 and the electronic device 50. The cooperation between the clips 20, 30 and the electronic device 50 is established at an elevation vertically above the portion of the back plate 70 when the holding device 10 is coupling the electronic device 50 to the user.

In one embodiment, the first clip 20, the second clip 30 or both the first and second clips 20, 30 can each have at least one internal recess or slot 40 (shown with reference to the second clip 30 in FIGS. 2 and 7) to receive a peripheral portion of the electronic device 50. According to an alternate embodiment, the first clip 20, the second clip 30 or both the first clip 20 and the second clip 30 may have two internal slots. For example, the slot 120 shown in FIG. 7 formed within the slot 40 encapsulates the volume control button on the electronic device 50, preventing the alteration of the volume level while the electronic device 50 is coupled to the holding device 10. According to another embodiment, the first clip 20, the second clip 30 or both the first clip 20 and the second clip 30 may include finger pad dimples 110 on its outer diameter to enable ergonomic handling and possibly prevent slipping.

Figure 11:
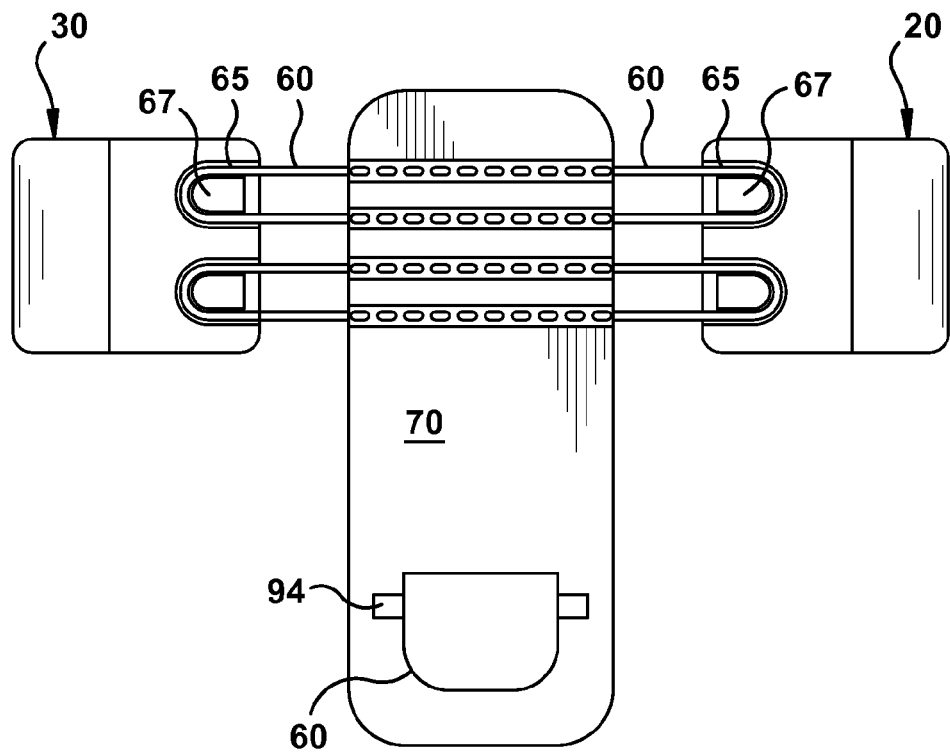
FIG. 11 shows a front view of the illustrative embodiment of a holding device including the kickstand in FIG. 10.

The first and second clips 20, 30 each also include a generally horseshoe-shaped slot 65 as shown in FIG. 11. A pedestal 67 defining an interior radius of the slot 65 establishes a catch about which a band 60 can at least partially extend. As shown in FIG. 11, the band 60 can be thought of as entering the slot 65 on one side of the pedestal 67, wrapping around the pedestal to complete a 180° change of direction, and exiting the slot 65 on the side of the pedestal opposite the side the band 60 entered the slot 65. The band 60 similarly extends at least partially around a pedestal 67 defining a portion of another generally horseshoe-shaped slot 65 formed in the opposing clip, and forms a continuous loop between the first and second clips 20, 30. The embodiments discussed in detail herein include two such bands 60 that engage a set of two pedestals 67 defining portions of a pair of the slots 67 provided to each of the first and second clips 20, 30. However, it is to be understood that any desired number of bands 20, and accordingly, the slots 65 and pedestals 67, can be provided to the first and second clips 20, 30 without departing from the scope of this application.

The second clip 30 may have the same characteristics as the first clip 20. In one embodiment, the second clip 30 may be identical to the first clip 20. The first and/or second clips 20, 30 can each independently be formed from a low-friction material such as Delrin®, which is the trade name registered by DuPont™ for an acetal resin material, for example.

Each band 60 may couple the first clip 20 to the second clip 30. The band 60 may create a tension that may pull the first and second clip together and hold the clips 20, 30 firmly against the peripheral portions of the electronic device 50. The band 60 may be made of any suitable material that can allow a tension to be created between the clips 20, 30. According to one embodiment, each band 60 may be made of a rubber or a substantially-elastic material. The band 60 may have a substantially-circular cross sectional shape, having a diameter that allows creating the desired tension between the clips 20, 30. In one embodiment, the band may have a diameter of about 0.80 to about 1.6 inches. In one embodiment, the band may have a diameter of about 1.2 inches.

The back plate 70 may have a shape and size that allows holding the electronic device 50 in place when coupled to the user. According to one embodiment, the back plate 70 may have a generally rectangular, square, triangular, polygonal, or round shape. According to a specific embodiment, the back plate 70 may be rectangular. The back plate 70 may have a size that allows the holding of the electronic device. In one embodiment the back plate 70 may be about 2.6 inches long, about 1.0 inch wide and about 0.190 of an inch thick.

According to one embodiment, the back plate 70 may include at least one slot 80 (FIGS. 8 and 10) extending transversely from one side of the back plate 70 to an opposite side of the back plate 70 to receive the bands 60. In one embodiment, the slot(s) 80 may be about 0.090 in depth. According to other embodiments, the back plate 70 may include four slots 80. In one embodiment, the back plate 70 may include a generally T-shaped slot located adjacent to an uppermost region of the back plate 70. In one embodiment, a bungee/Lanyard or strap 111 may be attached into the T-shaped slot to enable user to connect the holding device 10 to his or her person or any other surface.

The holding device 10 may be positioned onto the back of the electronic device 50 by pulling the clips 20, 30 outward (i.e., away from each other) and placing the clips 20, 30 over the peripheral portions of the electronic device 50. Once in place at a desired location, the clips 20, 30 can be released by the user to allow the elasticity of the band(s) 60 to urge the clips 20, 30 generally towards each other. The length of the band(s) 60 should be such that the elasticity of the band(s) 60 urges the clips 20, 30 towards an unbiased separation between the clips 20, 30 that is closer together than a width of the portion of the electronic device that is to be received between the clips 20, 30. In other words, a tension on the band(s) 60 continues to urge the clips 20, 30 toward each other once the clips 20, 30 are fully cooperating with the electronic device 50. In this manner, the compressive force will be exerted by the clips 20, 30 on the electronic device 50, thereby maintaining the position of the clips 20, 30 along the periphery of the electronic device 50, and snugly coupling the electronic device 50 to the holding device 10.

As mentioned above, the back plate 70 is disposed between the band(s) 60 and the electronic device 50 as shown in FIG. 8. The force exerted on the band(s) 60 by the back plate 70 tends to push the band(s) 60 generally into the slots 65 (FIG. 11), thereby maintaining the connection between the clips 20, 30.

The back plate 70 may allow securing the holding device 10 onto a pocket belt, a strap, a belt, or seatbelts. A textured surface 95 (FIG. 12) including ridges integrally formed as part of the back plate 70 or any other friction-enhancing texture can be provided to a surface of the back plate 70 to enhance friction between the back plate 70 and an article of clothing to which the holding device 10 is coupled. Clamping the electronic device 50 to a pocket may allow the user to quickly respond to calls, reducing the possibility of missed calls.

The holding device 10 may eliminate the loss of the electronic device 50 because: 1) the electronic device may be attached to the user by means of a spring-loaded back plate 70 and 2) the electronic device may be attached to the user by using a bungee/lanyard strap reducing the possibility of damage to mobile device if dropped and/or loss. Furthermore, the holding device 10 may encapsulate a small surface area of the electronic device, which may enable the electronic device to run at normal operating temperature.

Figure 10:
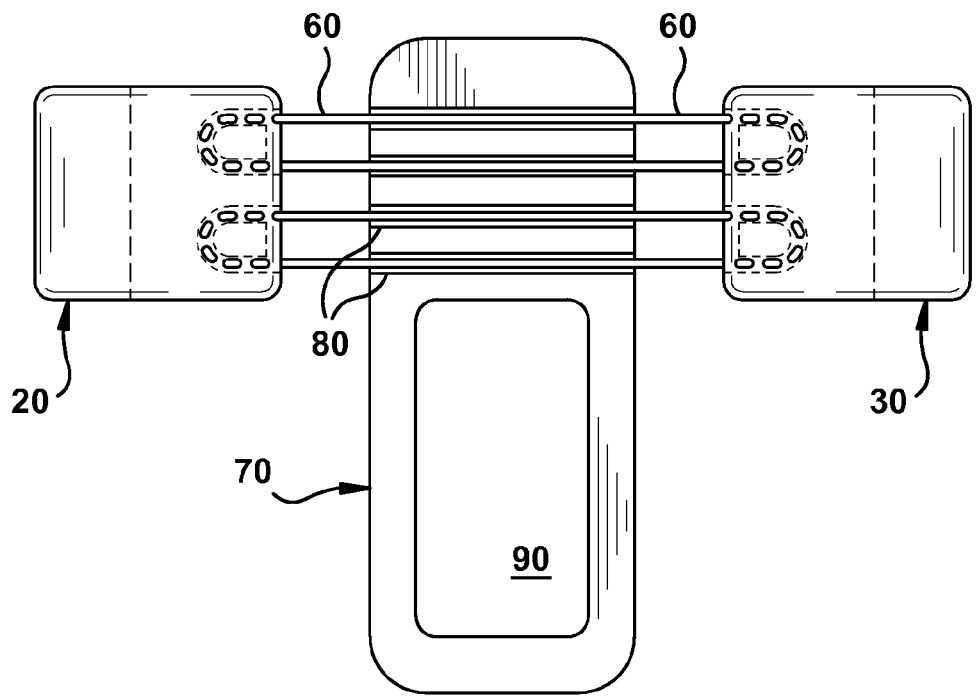
FIG. 10 shows a rear view of an illustrative embodiment of a holding device that includes a kickstand that is pivotally adjustable to maintain a portable electronic device in a generally upright orientation for viewing by the user.
Figure 12:
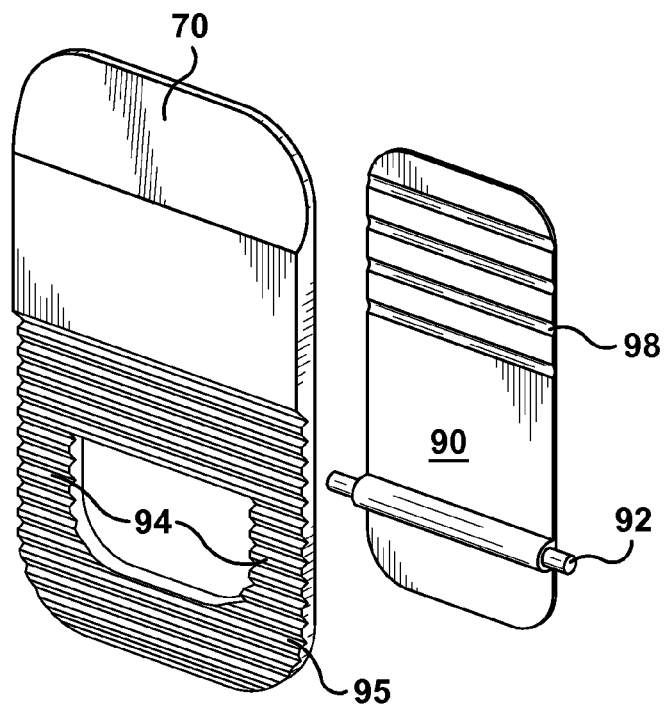
FIG. 12 shows an exploded view of an illustrative embodiment of a back plate and a pivotally-adjustable kickstand.
Figure 13:
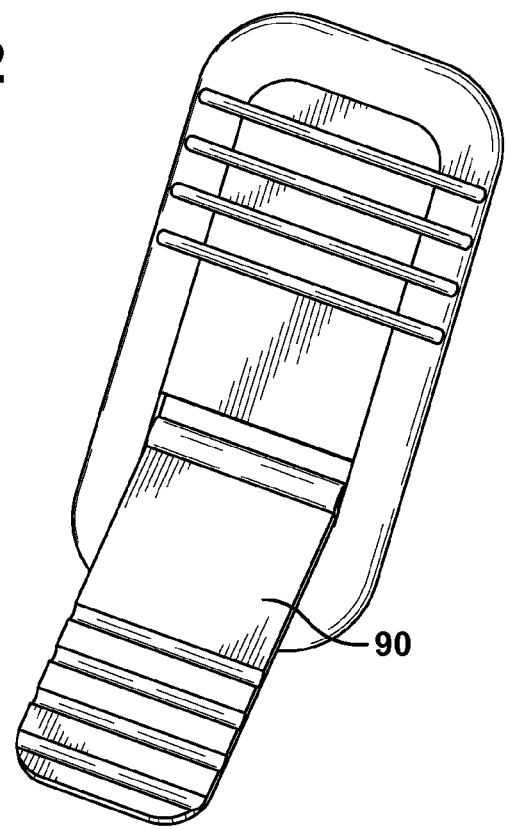
FIG. 13 shows a perspective view of the illustrative embodiment of the back plate with the kickstand in FIG. 12.

FIGS. 10-14 illustrate another embodiment of the back plate 70 including a pivotally-adjustable kickstand 90. As shown in FIG. 10, the kickstand 90 is pivoted generally toward the surrounding portion of the back plate 70, thereby forming a portion of the back plate 70 when stowed. The pivotal connection can be accomplished with any suitable pivotal connector. For example, a pair of pins 92 is received within corresponding slots 94 formed in the surrounding portion of the back plate 70 as shown in FIGS. 11 and 12. A window 96 formed in the back plate 70 allows for the overhanging portion of the kickstand 90 to rotate about the pins 92 without contacting the back plate 70 in a manner that would interfere with deployment of the kickstand 90. The kickstand 90 can be pivoted about the pins 92 toward a deployed orientation shown in FIGS. 13 and 14. The kickstand can optionally also include slots 98 that receive the band(s) 60 and allow the kickstand to be stowed substantially flush with the back plate 70, thereby minimizing the size of the holding device 10 for comfort when being worn by the user.

In one embodiment, the parts are manufactured on CNC machines or injection molded. In another embodiment, the parts are made of plastic, metal, or wood.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A holding device for an electronic device, the holding device comprising:
   a first clip adapted to cooperate with a peripheral portion of the electronic device;
   a second clip that opposes the first clip and is separated from the first clip by a first distance, wherein the second clip is adapted to cooperate with a separate peripheral portion of the electronic device;
   a substantially-elastic band that extends between and couples the first clip and the second clip; and
   a back plate that is at least partially disposed between the first clip and the second clip, wherein
   the back plate is positioned to be at least partially supported between the substantially-elastic band and the electronic device when the electronic device is coupled to the holding device;
   wherein at least one of the first clip and the second clip comprises a substantially C-shaped portion that extends at least partially around at least one of the peripheral portion and the separate peripheral portion of the electronic device to couple the electronic device to the holding device; and
   wherein at least one of the first clip and the second clip further comprises an additional recessed portion for receiving a control device of the electronic device to protect the control device from adjustment while the electronic device is coupled to the holding device.

2. The holding device of claim 1, wherein the first distance separating the first clip from the second clip when the substantially-elastic band is in an unbiased state is less than a second distance separating the peripheral portion of the electronic device and the separate peripheral portion of the electronic device to be coupled to the holding device.

3. The holding device of claim 2, wherein the first distance is a distance separating portions of the first and second clips that are adapted to cooperate with the peripheral and the separate peripheral portions of the electronic device, and wherein the second distance is another distance separating the peripheral and the separate peripheral portions of the electronic device that are to cooperate with the portions of the first and second clips.

4. The holding device of claim 1, wherein the back plate comprises at least one slot that receives at least a portion of the substantially-elastic band.

5. The holding device of claim 1, wherein the back plate extends to an elevation that is vertically lower than the first and second clips when the electronic device is coupled to the holding device.

6. The holding device of claim 1, wherein
   the back plate comprises a friction-enhancing texture to enhance friction between the back plate and an article of clothing or other item to which the holding device is to be coupled.

7. A holding device for an electronic device, the holding device comprising:
   a first clip adapted to cooperate with a peripheral portion of the electronic device;
   a second clip that opposes the first clip and is separated from the first clip by a first distance, wherein the second clip is adapted to cooperate with a separate peripheral portion of the electronic device;
   a substantially-elastic band that extends between and couples the first clip and the second clip; and
   a back plate that is at least partially disposed between the first clip and the second clip, wherein
   at least one of the first clip and the second clip comprises an arcuate slot defined at least in part by a pedestal about which the band extends.

8. A holding device for an electronic device, the holding device comprising:
a first clip adapted to cooperate with a peripheral portion of the electronic device;
a second clip that opposes the first clip and is separated from the first clip by a first distance, wherein the second clip is adapted to cooperate with a separate peripheral portion of the electronic device;
a substantially-elastic band that extends between and couples the first clip and the second clip; and
a back plate that is at least partially disposed between the first clip and the second clip, wherein
the back plate is positioned to be at least partially supported between the substantially-elastic band and the electronic device when the electronic device is coupled to the holding device; and
wherein the holding device further comprises a kickstand pivotally coupled to the back plate to be deployed for maintaining the electronic device, when coupled to the holding device, in a generally upright orientation.

9. The holding device of claim 8, wherein the kickstand is substantially flush with the back plate when the kickstand is pivoted to a stowed orientation.

10. A holding device for an electronic device, the holding device comprising:
a first clip adapted to cooperate with a peripheral portion of the electronic device;
a second clip that opposes the first clip and is separated from the first clip by a first distance, wherein the second clip is adapted to cooperate with a separate peripheral portion of the electronic device;
a substantially-elastic band that extends between and couples the first clip and the second clip;
a back plate that is at least partially disposed between the first clip and the second clip; and
a kickstand pivotally coupled to the back plate to be deployed for maintaining the electronic device, when coupled to the holding device, in a generally upright orientation, wherein
the kickstand is substantially flush with the back plate when the kickstand is pivoted to a stowed orientation, and wherein
the kickstand comprises at least one slot that receives at least a portion of the band when in the stowed orientation.

* * * * *